US012781091B2

(12) United States Patent
Gonzalez Leon et al.

(10) Patent No.: US 12,781,091 B2
(45) Date of Patent: Nov. 3, 2026

(54) VEGETABLE OIL COMPOSITION FOR COATING PARTICLES

(71) Applicant: Arkema France, Colombes (FR)

(72) Inventors: Juan Antonio Gonzalez Leon, Pierre-Benite (FR); Dominique Imbert, Pierre-Benite (FR)

(73) Assignee: ARKEMA FRANCE, Le Défense (FR)

( * ) Notice: Subject to any disclaimer, the term of this patent is extended or adjusted under 35 U.S.C. 154(b) by 871 days.

(21) Appl. No.: 17/421,214

(22) PCT Filed: Jan. 9, 2020

(86) PCT No.: PCT/FR2020/050029
§ 371 (c)(1),
(2) Date: Jul. 7, 2021

(87) PCT Pub. No.: WO2020/144439
PCT Pub. Date: Jul. 16, 2020

(65) Prior Publication Data

US 2022/0064484 A1 Mar. 3, 2022

(30) Foreign Application Priority Data

Jan. 10, 2019 (FR) ...................................... 1900221

(51) Int. Cl.

| | |
|---|---|
| ***C09D 191/00*** | (2006.01) |
| ***C05G 5/30*** | (2020.01) |
| ***C09D 7/63*** | (2018.01) |
| *C05C 1/00* | (2006.01) |
| *C08K 5/17* | (2006.01) |

(52) U.S. Cl.
CPC ............. *C09D 191/00* (2013.01); *C05G 5/37* (2020.02); *C09D 7/63* (2018.01); *C05C 1/00* (2013.01); *C08K 5/175* (2013.01)

(58) Field of Classification Search
None
See application file for complete search history.

(56) References Cited

U.S. PATENT DOCUMENTS

| | | | | |
|---|---|---|---|---|
| 4,140,640 | A * | 2/1979 | Scherubel | C09K 8/72 507/250 |
| 6,702,850 | B1 * | 3/2004 | Byun | A61L 31/10 623/1.42 |
| 6,756,520 | B1 | 6/2004 | Krzysik et al. | |
| 6,776,936 | B2 | 8/2004 | Hardcastle et al. | |
| 2002/0103139 | A1 | 8/2002 | Weisspapir et al. | |
| 2005/0256262 | A1 * | 11/2005 | Hill | C09D 7/43 524/702 |
| 2006/0040049 | A1 | 2/2006 | Spence | |
| 2007/0215347 | A1 * | 9/2007 | Tang | C09K 8/74 166/308.1 |
| 2010/0211158 | A1 * | 8/2010 | Haverty | C23C 24/04 427/2.24 |
| 2013/0192006 | A1 * | 8/2013 | Tinker | C11D 3/042 510/276 |
| 2015/0072152 | A1 * | 3/2015 | Yokoyama | C09D 191/00 428/423.1 |
| 2017/0122125 | A1 * | 5/2017 | Colley | F01D 25/36 |
| 2018/0031516 | A1 * | 2/2018 | Glas | H04L 67/52 |
| 2019/0000074 | A1 * | 1/2019 | Peris | A01N 25/02 |

FOREIGN PATENT DOCUMENTS

| | | | | |
|---|---|---|---|---|
| CN | 101948350 A | | 1/2011 | |
| CN | 106977275 A | | 7/2017 | |
| EP | 0390322 A2 | | 10/1990 | |
| EP | 0768993 A1 | | 4/1997 | |
| EP | 1425147 A1 | | 6/2004 | |
| ES | 2319267 T3 | | 5/2009 | |
| GB | 1 292 718 A | | 10/1972 | |
| GB | 1 312 314 A | | 4/1973 | |
| GB | 1 383 444 A | | 2/1974 | |
| WO | 0132031 A2 | | 5/2001 | |
| WO | 02090295 A1 | | 11/2002 | |
| WO | 03103633 A1 | | 12/2003 | |
| WO | 2009/004024 A2 | | 1/2009 | |
| WO | 2009099392 A1 | | 8/2009 | |
| WO | 2014182513 A1 | | 11/2014 | |
| WO | WO-2018236596 A1 | * | 12/2018 | A01N 25/04 |

OTHER PUBLICATIONS

International Search Report and Written Opinion for International Application No. PCT/FR2020/050029, dated Mar. 30, 2020, 7 pages.
Encyclopedia of Chemical Technology, 4th Edition, Kirk-Othmer, vol. 23, pp. 504-505 (1997).
Ullmann's Encyclopedia of Industrial Chemistry, 5th Edition, Elvers, B., Hawkins, S. and Schulz, G., vol. A19, pp. 562-564 (1994).
Wasow, G., "Phosphorus-containing Anionic Surfactants," Organic Chemistry, vol. 56, pp. 551-565 (1996).
Edited by Helmut W. Stache, Anionic Surfactants: Organic Chemistry, vol. 56, pp. 552-565, Marcel Dekker, Inc. (1996).
Office Action issued Aug. 26, 2024, by the Canadian Intellectual Property Office in corresponding Canadian Patent Application No. 3,125,259 and an English machine translation of the Office Action. (10 pages).

(Continued)

*Primary Examiner* — Stefanie J Cohen

(74) *Attorney, Agent, or Firm* — Buchanan Ingersoll & Rooney PC

(57) ABSTRACT

The present invention relates to a coating composition comprising at least from 1% by weight to 30% by weight, limits included, of a surfactant, preferably a nitrogen-containing surfactant, and from 5% by weight to 99% by weight, limits included, of a cyclic alcohol, comprising 12 to 100 carbon atoms, limits included, and of derivatives of this.

The present invention also relates to the granular material coated with said composition.

18 Claims, No Drawings

(56) References Cited

OTHER PUBLICATIONS

Office Action issued Oct. 23, 2024, by the Colombia Patent Office in corresponding Colombian Patent Application No. NC2024/0006482 and an English machine translation of the Office Action. (25 pages).

* cited by examiner

VEGETABLE OIL COMPOSITION FOR COATING PARTICLES

CROSS-REFERENCE TO RELATED APPLICATIONS

This application is the national phase of International Application No. PCT/FR2020/050029, filed 9 Jan. 2020, which claims priority to French Application No. FR 1900221, filed 10 Jan. 2019. the disclosure of each of these applications being incorporated herein by reference in its entirety for all purposes.

FIELD OF THE INVENTION

The present invention relates to the field of coating compositions applied to granular materials, such as granular fertilizers, in order to improve their quality and to obtain easier, longer and safer storage.

According to the invention, a granular material is a discrete solid particle which can be produced by many different chemical or mechanical processes in which one or more components are consolidated.

BACKGROUND OF THE INVENTION

Fertilizers are materials which provide one or more of the nutrients which are necessary for the correct development and growth of plants. These can be, for example, chemical or inorganic fertilizers, manure or plant residues. Fertilizers are usually in the form of granular materials, given that this facilitates their storage, their transportation and their use in the fields. There exist many known processes for preparing fertilizers in the form of a granular material, such as granulation, crystallization, crushing, grinding, prilling and compacting, inter alia.

The fertilizer and other inorganic products are often stored in large amounts over different periods of time. Many of them have a tendency to agglomerate during storage and to generate a large amount of dust during transportation. Agglomeration can make the transportation and the use of fertilizers and of other inorganic products difficult, very difficult or even impossible, insofar as they cannot flow correctly. In addition, the dust generated during the transportation and during the loading and unloading operations for such products can cause serious health and safety problems insofar as the atmosphere can become saturated with fine inorganic particles.

A common solution for reducing such problems consists in applying a fine coating of a liquid or solid formulation to the particles. This coating prevents or slows down the agglomeration process and suppresses or at least reduces the generation of fine dust from the surface of the particle, for example a fertilizer or an inorganic or other product. The coating, in a liquid form, is usually sprayed onto the particles before storage.

The known coating formulations of this type are mainly based on mineral oils, often comprising surfactants in order to reduce any agglomeration effect. These formulations can also contain other components which modify the viscosity of the formulation, such as waxes.

There are already publications which mention coatings containing oils from a renewable source, such as vegetable oils, which can also prevent agglomeration and the generation of dust, for example for fertilizer coatings.

The patent EP0768993B1 claims an agricultural composition comprising a nitrate-based fertilizer and a coating which comprises wax and oil, which can be a vegetable oil, in order to reduce the formation of dust and the absorption of moisture by the fertilizer. However, no improvement in the protection against agglomeration by the coating described is claimed in this document.

The patent EP1390322B1 claims fertilizers containing nitrates coated with a formulation containing an oil among an oil of vegetable origin, resulting from fish or of animal origin, a wax, a surfactant, a resin and a polymer which is biodegradable, without precise instructions on the chemistry of the natural oils for the expected anti-caking or dust-generating properties.

The patent EP1425147B1 claims the use of a composition for the coating of fertilizers in order to reduce agglomeration, said composition comprising salts of esters of phosphoric acid with trialkylamines and an inert solvent, such as mineral oil and waxes, animal or vegetable oils, fatty acids, natural waxes or their mixtures.

The document US2006040049 A1 discloses a coating composition for protection against agglomeration and dust comprising a metal salt of a fatty acid, using as diluent a substance chosen from methyl or ethyl esters of fatty acids, oils, vegetable oils, such as corn, rapeseed, cottonseed, sunflower, soybean or tall oil, glycerol or glycols or petroleum hydrocarbons in combination with fatty acid esters, oils, glycerol or mineral oil.

The patent EP1390322B1 discloses formulations comprising an oil and a surfactant, in which oils derived from fish oil are preferred.

According to these known publications, vegetable oils are mentioned among other possible diluents in anti-caking coating formulations, without pointing out any particular given characteristic for vegetable oils. In addition, some publications mention, as anti-caking agents, specific surfactant salts which are compatible with vegetable oils, which generally are incompatible with the commonest (and usually the best) anti-caking agents, which are saturated primary fatty amines and their salts.

It should be mentioned, however, that all the current fertilizer coating formulations commonly used or proposed comprising vegetable oils are based on specific anti-caking agents which do not necessarily provide the best protection.

There is still a lack, on the market, of effective anti-caking and anti-dusting formulations comprising renewable vegetable oils. Such formulations, however, would be environmentally friendly, due to the presence of renewable oils, and thus would be very useful compared to other less environmentally friendly coating formulations, such as those using mineral oils. The use of vegetable oils with commonly used anti-caking agents, such as primary fatty amines, does not seem today a very easy task, as shown for example in the document ES2319267B1, where the chemical incompatibility of such anti-caking agents with most vegetable oils is pointed out.

The applicants have now found compositions based on vegetable oil endowed with improved anti-caking and anti-dusting properties. More specifically, the applicants have found compositions for the coating of particles which have an improved performance and which are based on specific anti-caking agents and specific vegetable oils.

SUMMARY OF THE INVENTION

Consequently, and in a first aspect, the present invention is a coating composition comprising at least:

- from 1% by weight to 30% by weight, limits included, of a surfactant, preferably a nitrogen-containing surfactant,
- from 5% by weight to 99% by weight, limits included, of a cyclic alcohol, comprising 12 to 100 carbon atoms, limits included, and of derivatives of this,
- it being understood that, when the cationic surfactant is a nitrogen-containing surfactant, said surfactant is chosen from primary amines and secondary amines, and their salts.

The surfactant, serving as an anti-caking agent in the composition of the present invention, is chosen from cationic and anionic surfactants, such as fatty amines, fatty acids, alkyl esters of phosphoric acid, alkylsulfonates and the like.

According to a preferred embodiment, the preferred surfactants in the composition of the present invention are chosen from cationic surfactants, such as, for example, surfactants chosen from primary amines and secondary amines, and their salts, preferably primary amines, such as those of formula R—$NH_2$, in which R is a hydrocarbon chain containing from 8 to 36 carbon atoms, preferably from 12 to 24 carbon atoms, and more preferably still the hydrocarbon chain is a linear or branched hydrocarbon chain, more preferably still a linear hydrocarbon chain and most preferably a linear $C_8$-$C_{36}$, preferably linear $C_{12}$-$C_{24}$, alkyl chain. Preferably, the nitrogen-containing surfactant is chosen from primary amines and secondary amines, and their salts, and more preferably the nitrogen-containing surfactant is a fatty amine, more preferably still a saturated linear fatty amine comprising 16 to 18 carbon atoms.

According to another embodiment, the surfactant is an anionic surfactant chosen from alkyl esters of phosphoric acid, such as those, for example, described in the *Encyclopedia of Chemical Technology,* $4^{th}$ Edition, Kirk-Othmer, Volume 23, pp. 504-505 (1997), in *Ullmann's Encyclopedia of Industrial Chemistry,* $5^{th}$ Edition, Elvers, B., Hawkins, S. and Schulz, G., Volume A19, pp. 562-564, or also in *Phosphorus-containing Anionic Surfactants*, Wasow, G., or also in *Anionic Surfactants: Organic Chemistry*, Volume 56, Marcel Dekker (1996), pp. 552-564.

According to one embodiment of the present invention, the alkyl esters of phosphoric acid comprise, inter alia, esters comprising a saturated or unsaturated and linear or branched, and more preferably saturated and linear, $C_6$-$C_{30}$, preferably $C_6$-$C_{20}$, hydrocarbon chain.

Examples of alkyl esters of phosphoric acid which can be used in the context of the present invention as anionic surfactants comprise, without limitation, the monohexyl ester of phosphoric acid, the dihexyl ester of phosphoric acid, the mono(n-octyl) ester of phosphoric acid, the di(n-octyl) ester of phosphoric acid, the monoisooctyl ester of phosphoric acid, the diisooctyl ester of phosphoric acid, the mono(n-decyl) ester of phosphoric acid, the monoisodecyl ester of phosphoric acid, the di(n-decyl) ester of phosphoric acid, the diisodecyl ester of phosphoric acid, the mono(n-dodecyl) ester of phosphoric acid, the monoisododecyl ester of phosphoric acid, the di(n-dodecyl) ester of phosphoric acid, the diisododecyl ester of phosphoric acid, the mono (n-hexadecyl) ester of phosphoric acid, the monoisohexadecyl ester of phosphoric acid, the di(n-hexadecyl) ester of phosphoric acid, the diisohexadecyl ester of phosphoric acid, the mono(n-octadecyl) ester of phosphoric acid, the monoisooctadecyl ester of phosphoric acid, the di(n-octadecyl) ester of phosphoric acid, and the diisooctadecyl ester of phosphoric acid.

Other examples of anionic surfactants which can be used in the context of the present invention comprise alkoxylated alkyl esters, among which may be mentioned and in particular, and without limitation, alkoxylated alkyl esters with a saturated or unsaturated and linear or branched, and preferably saturated and linear, $C_6$-$C_{30}$, preferably $C_6$-$C_{20}$, hydrocarbon chain with a sequence of one or more units, preferably of 1 to 10 units, more preferably of 3 to 8 units, chosen from ethylene oxide, propylene oxide or butylene oxide units and their mixtures.

Typical examples of such alkoxylated alkyl esters of phosphoric acid comprise, without limitation, the ethoxylated monohexyl ester of phosphoric acid, the ethoxylated dihexyl ester of phosphoric acid, the ethoxylated mono(n-octyl) ester of phosphoric acid, the ethoxylated di(n-octyl) ester of phosphoric acid, the ethoxylated monoisooctyl ester of phosphoric acid, the ethoxylated diisooctyl ester of phosphoric acid, the ethoxylated mono(n-decyl) ester of phosphoric acid, the ethoxylated monoisodecyl ester of phosphoric acid, the ethoxylated di(n-decyl) ester of phosphoric acid, the ethoxylated diisodecyl ester of phosphoric acid, the ethoxylated mono(n-dodecyl) ester of phosphoric acid, the ethoxylated monoisododecyl ester of phosphoric acid, the ethoxylated di(n-dodecyl) ester of phosphoric acid, the ethoxylated diisododecyl ester of phosphoric acid, the ethoxylated mono(n-hexadecyl) ester of phosphoric acid, the ethoxylated monoisohexadecyl ester of phosphoric acid, the ethoxylated di(n-hexadecyl) ester of phosphoric acid, the ethoxylated diisohexadecyl ester of phosphoric acid, the ethoxylated mono(n-octadecyl) ester of phosphoric acid, the ethoxylated monoisooctadecyl ester of phosphoric acid, the ethoxylated di(n-octadecyl) ester of phosphoric acid, the ethoxylated diisooctadecyl ester of phosphoric acid, as well as the propoxylated monohexyl ester of phosphoric acid, the propoxylated dihexyl ester of phosphoric acid, the propoxylated mono(n-octyl) ester of phosphoric acid, the propoxylated di(n-octyl) ester of phosphoric acid, the propoxylated monoisooctyl ester of phosphoric acid, the propoxylated diisooctyl ester of phosphoric acid, the propoxylated mono (n-decyl) ester of phosphoric acid, the propoxylated monoisodecyl ester of phosphoric acid, the propoxylated di(n-decyl) ester of phosphoric acid, the propoxylated diisodecyl ester of phosphoric acid, the propoxylated mono(n-dodecyl) ester of phosphoric acid, the propoxylated monoisododecyl ester of phosphoric acid, the propoxylated di(n-dodecyl) ester of phosphoric acid, the propoxylated diisododecyl ester of phosphoric acid, the propoxylated mono(n-hexadecyl) ester of phosphoric acid, the propoxylated monoisohexadecyl ester of phosphoric acid, the propoxylated di(n-hexadecyl) ester of phosphoric acid, the propoxylated diisohexadecyl ester of phosphoric acid, the propoxylated mono(n-octadecyl) ester of phosphoric acid, the propoxylated monoisooctadecyl ester of phosphoric acid, the propoxylated di(n-octadecyl) ester of phosphoric acid, the propoxylated diisooctadecyl ester of phosphoric acid.

In the composition of the present invention, the surfactant can be a mixture of one or more surfactants; preferably, the surfactant is chosen from anionic surfactants and cationic surfactants, as well as the mixtures of these.

More preferably, the surfactant is a mixture of at least one cationic surfactant and of at least one anionic surfactant, it being possible for said mixture, for example, to be a salt formed between a nitrogen-containing surfactant and an anionic surfactant of acid type, for example, and preferably a phosphoric acid ester or a sulfuric acid ester or an alkyl(aryl)sulfonic acid.

Preferably, the surfactant is a mixture of at least one cationic surfactant and of at least one anionic surfactant, said anionic surfactant being chosen from monoalkyl esters of phosphoric acid, dialkyl esters of phosphoric acid, alkoxylated (for example ethoxylated or propoxylated or also ethoxylated and propoxylated) monoalkyl esters of phosphoric acid, alkoxylated (for example ethoxylated or propoxylated or also ethoxylated and propoxylated) dialkyl esters of phosphoric acid, alkyl esters of sulfuric acid, alkoxylated (for example ethoxylated or propoxylated or also ethoxylated and propoxylated) alkyl esters of sulfuric acid, alkylsulfonic acids, arylsulfonic acids, including alkylarylsulfonic acids, alkoxylated alkylsulfonates and (alkyl ether)sulfonates.

More preferably still, the surfactant intended to be used in the composition of the present invention is a mixture comprising at least one surfactant chosen from primary amines and secondary amines, and their salts, and at least one alkyl ester of phosphoric acid, including the alkoxylated forms.

According to a preferred embodiment of the present invention, the surfactant intended to be used in the composition of the present invention is a mixture comprising at least one surfactant chosen from primary amines and secondary amines, and their salts, and an ethoxylated monoalkyl ester of phosphoric acid or an ethoxylated dialkyl ester of phosphoric acid.

Mention may be made, for example, of the mixture formed between octadecylamine and the mono(n-octadecyl) ester of phosphoric acid, the mixture between octadecylamine and the ethoxylated mono(n-octadecyl) ester of phosphoric acid or also the mixture between octadecylamine and the propoxylated mono(n-octadecyl) ester of phosphoric acid, as well as their mixtures.

According to another preferred embodiment of the present invention, the surfactant intended to be used in the composition of the present invention is a mixture comprising at least one surfactant chosen from primary amines and secondary amines, and their salts, and at least one anionic surfactant chosen from monoalkyl esters of phosphoric acid and dialkyl esters of phosphoric acid.

Mention may be made, for example, of the mixture formed between octadecylamine and the di(n-octadecyl) ester of phosphoric acid, the mixture between octadecylamine and the ethoxylated di(n-octadecyl) ester of phosphoric acid or the mixture between octadecylamine and the propoxylated di(n-octadecyl) ester of phosphoric acid, as well as their mixtures.

According to another preferred embodiment of the present invention, the surfactant intended to be used in the composition of the present invention is a mixture comprising at least one surfactant chosen from primary amines and secondary amines, and their salts, and at least one anionic surfactant chosen from alkylsulfonic acids, arylsulfonic acids, including alkylarylsulfonic acids, alkylsulfonates, which are alkoxylated, and (alkyl ether)sulfonates, for example the mixture formed between octadecylamine and dodecylsulfonic acid or the mixture formed between octadecylamine and dodecylbenzenesulfonic acid.

As indicated above, the surfactant(s) serving as anti-caking agent in the composition of the present invention is(are) present at dosages ranging from 1% by weight to 30% by weight. Preferably, the anti-caking agent of the present invention is used at dosages ranging from 1% by weight to 25% by weight, more preferably from 2% by weight to 20% by weight and more preferably still from 2% by weight to 15% by weight, limits included, with respect to the total coating composition.

Preferably, the cyclic alcohols, and the derivatives of these, intended to be used in the composition of the present invention result from natural sources. The cyclic alcohol mentioned above is preferably in the form of an alcohol ester. The molecular weight of such cyclic alcohols is preferably greater than 100 $g \cdot mol.^{-1}$, more preferably still greater than 200 $g \cdot mol^{-1}$. Phytosterols, such as sterols and sitosterols, are preferred examples of such cyclic alcohols originating from natural sources. Preferred derivatives of such cyclic alcohols are their esters with fatty acids. Such components are well known in the art and can, for example, be found naturally in byproducts in the papermaking industry. According to another preferred embodiment, the cyclic alcohols, and the derivatives of these, result from the distillation of crude tall oil. According to yet another preferred embodiment, the cyclic alcohol, and the derivatives of this, are those present in the heavier distillation fractions from crude tall oil, namely those known under the usual name of "tall oil pitch".

In yet another preferred embodiment, the cyclic alcohol intended to be used in the composition of the present invention is those resulting from vegetable oils, for example cyclic alcohols, and the derivatives of these, which are present in crude cashew nut oil, for example cardanol and the derivatives of this, and the like.

As indicated above, the cyclic alcohol (or the derivative) intended to be used in the composition of the present invention is present in the composition of the present invention at dosages ranging from 5% by weight to 99% by weight. Preferably, the cyclic alcohol (or the derivative) is used at dosages ranging from 7% by weight to 80% by weight, more preferably from 10% by weight to 60% by weight and more preferably still from 20% by weight to 50% by weight, limits included, with respect to the total coating composition.

The remainder to 100% by weight of the composition described above, if appropriate, can comprise all kinds of additives, fillers and other components which are commonly used in the art and, for example, components chosen from mineral or vegetable oils, mineral or vegetable waxes, fatty acids and esters, and the like.

The other preferred component(s) of this type are possibly and advantageously chosen from:

- rheology modifiers, such as biodegradable or non-biodegradable polymers, waxes, preferably waxes originating from renewable mineral sources or synthetic waxes, such as Fischer-Tropsch waxes, amidoamides, alkylamidoamides,
- hydrophobizing agents, such as linear alkyl alcohols or macrocrystalline waxes,
- dispersing agents, such as oils originating from vegetable or mineral sources,
- dyes, UV tracers, pigments, colorants,
- mineral and/or organic micronutrients and trace elements which can be, but preferably are, finely dispersed and/or compatibilized, for example metal complexes,
- biostimulants, such as mineral or organic materials and substances which are added to improve or maintain the biological functions of soils, animals and plants,
- pesticides, such as insecticides, herbicides, fungicides, nematicides and the like,
- bacteria, yeasts, fungi, viruses,
- antioxidants, for example tert-butylhydroquinone (also known as TBHQ), preservatives, UV stabilizers, odor-masking agents, antiodorants, aromas, fragrances, and also mixtures of two or more of the components listed above.

The coating composition of the present invention can be used in a certain number of various fields of application and finds particularly effective use as coating composition for fertilizer granules, or granules of other mineral products, in order to reduce and even avoid the agglomeration of such fertilizer particles. The coating composition of the present invention can also be very useful for its anti-dusting properties, particularly when it is used as coating for fertilizer granules, or granules of other mineral products.

Consequently, and still as other aspect, the present invention relates to the use of the coating composition described above for the coating of a granular material, it being possible for the granular material to be any granular material well known in the art, such as those chosen from, by way of non-limiting examples, fertilizers, coal, ores, mineral aggregates, sulfur, wood chips, dirt, granulated waste, medicaments, cereals, granulated animal feed and the like, and more preferably the granular material being a fertilizer.

DETAILED DESCRIPTION OF THE INVENTION

A "fertilizer", within the meaning of the present invention, is a particle of inorganic and/or organic material which provides the soil and/or crops with mineral and/or organic nutrients or other substances which improve their growth. The fertilizer particles can originate from any known process for producing fertilizers, such as granulation, grinding, mixing or formulating, compacting or prilling.

Preferably, the fertilizer particles comprise nitrates, such as ammonium nitrates, nitrophosphates, ammonium phosphate sulfate, ammonium sulfate, calcium ammonium nitrates, calcium nitrate, diammonium phosphate, potassium chloride, monoammonium phosphate, muriate of potash, sulfate of potash, sulfate of potash magnesia, single superphosphate, triple superphosphate, urea, sulfur, polyhalite and other complex or composite fertilizers which contain several elements, and, for example, those known under the acronym NPK.

The composition of the present invention can be applied using techniques well known in the art and commonly used for the coating of particulate materials, such as those well known and used for the coating of granulated fertilizers, for example according to well-known spray coating techniques. This can be carried out using a batch or continuous process. For example, the granulated fertilizer can be introduced into a rotary coating drum while the coating is applied via one or more pressurized nozzles. The coating can also be sprayed while the granulated fertilizer rotates on an inclined granulation drum or is within a fluidized-bed chamber.

The stage of coating with the coating composition of the present invention can be carried out before one or more coatings of other material and/or at the same time as these and/or after these, such as, for example, the coating of additional nutrients or biological functions which are useful for soils or animals or plants, the coating of anti-caking agents, such as, for example, clays (for example kaolin), talc, and the like.

In a preferred embodiment, the stage of coating with the coating composition of the invention is carried out before one or more coatings of an additional ingredient which is talc and/or at the same time as these and/or after these.

Once applied to the surface of the particulate material, the amount of coating composition coated on said particulate material can vary widely. Such an amount advantageously and preferably amounts to an amount of between 0.02% by weight and 2% by weight, limits included, with respect to the total weight of the coated granular material.

The present invention also relates to the granular material coated with the composition of the present invention. Once applied to the surface of a granular material (for example and preferably a fertilizer granule), the composition of the present invention proves to be effective for achieving one or more of the following objectives:

- reducing or preventing the agglomeration of the coated particles,
- reducing or preventing the release of dust from the coated particles,
- reducing or preventing the absorption of moisture into the coated particles,
- binding, to the coated particle, other mineral or organic particles which can provide an additional nutrient or additional biological functions to soils or to animals or to plants, these mineral or organic particles being added to the particle before or after the composition of the present invention is applied.

The composition of the present invention, based on a renewable and advantageously biodegradable oil, confers effective protection against agglomeration and dust on particles, and in particular fertilizers. Such properties of protection against agglomeration and dust have proved to be better than those of conventional known coating compositions.

According to a preferred embodiment, the present invention relates to a fertilizer granule coated with a composition of the present invention. In another preferred embodiment, the particulate material, for example a fertilizer particle, is coated with a composition of the invention at a dosage of between 0.02% by weight and 2% by weight, limits included, with respect to the total weight of the coated particulate material.

The composition of the present invention makes it possible to obtain coated particles, and preferably coated fertilizer particles, exhibiting one or more of the advantages listed below, among which may be mentioned:

- there is no chemical reaction between the composition and the coated particle,
- the coating composition is not a polymer (a change in European law is currently underway to reduce and even eliminate the uses of polymers in fertilizers),
- compatibility with several types of oils from renewable sources, such as refined or crude oils or distillation residues,
- the coating process is the same as the current processes known in the art for coating particles (same spraying/coating equipment, same spraying temperatures).

The composition of the present invention can be used in a certain number of other fields of application and is in particular suitable for the coating of particles which exhibit a tendency to clump or to agglomerate and/or to generate dust, such as cereals, flours, medicaments, ceramics, mineral aggregates originating from quarries, and the like.

It is compatible with other commonly used components of coatings of fertilizers, such as surfactants, alcohols, waxes, colorants and the like.

The invention is further illustrated below by the following examples, which are presented as embodiments of the invention only, without bringing about any limitation of the scope of protection as defined by the appended claims.

EXAMPLES

Example 1

A comparative composition, comparative composition A, is prepared by mixing 10 g of a fatty amine surfactant, sold under the name Noram® SH by Arkema, 25 g of a microcrystalline mineral wax (freezing point >65° C., originating from Lotos Company) and 65 g of a mineral oil with a kinematic viscosity at 40° C. of between 130 $mm^2 \cdot s^{-1}$ and 220 $mm^2 \cdot s^{-1}$ (sold by Colas under the trade name "700S"). All the components are mixed at 90° C. until they are completely homogenized.

Another composition, comparative composition B, is prepared by mixing 10 g of a fatty amine surfactant, sold under the name Noram® SH by Arkema, 25 g of a microcrystalline mineral wax (freezing point >65° C., originating from Lotos Company) and 65 g of a degummed soybean oil originating from Cefetra. All the components are mixed at 90° C. until they are completely homogenized. Degumming is a well-known refining process in which the impurities of soybean oil, in particular the phosphatides or the gums, are removed from the crude vegetable oil. This vegetable oil does not contain amounts greater than traces of cyclic alcohols and of their derivatives. The presence, the nature and the amount of cyclic alcohols, as well as of derivatives of these, can be easily identified by standard analytical methods well known to a person who is a specialist in qualitative and quantitative analytical techniques, such as column chromatography coupled with mass spectrometry.

Another composition, composition C, according to the invention, is prepared by mixing 10 g of a fatty amine surfactant, sold under the name Noram® SH by Arkema, 25 g of a microcrystalline mineral wax (freezing point >65° C., originating from Lotos Company) and 65 g of a residue originating from tall oil, sold under the name Resinoline L by DRT. All the components are mixed at 90° C. until they are completely homogenized. This type of residue originating from tall oil contains more than 20% by weight of cyclic alcohols, which results in a content of at least 13% by weight of cyclic alcohol in the final coating composition. The viscosity of the tall oil residue used is measured using an Anton Paar MCR301 dynamic shear rheometer in a 50 mm parallel plate (PP50) geometry, between 50° C. and 10° C. at a shear rate of 80 $s^{-1}$, which gives a value of 212 mPa·s at 25° C.

Another comparative composition, composition D, is prepared by mixing 3.6 g of a fatty amine surfactant, sold under the name Noram® SH by Arkema, 6.4 g of an alkoxylated phosphoric acid ester surfactant, comprising a hydrocarbon chain comprising 16 to 18 carbon atoms and 4.5 ethylene oxide units (Surfaline® PE684 by Arkema), 25 g of a microcrystalline mineral wax (freezing point >65° C., originating from Lotos Company) and 65 g of a mineral oil with a kinematic viscosity at 40° C. of between 130 $mm^2 \cdot s^{-1}$ and 220 $mm^2 \cdot s^{-1}$ (sold by Colas under the name 700S). All the components are mixed at 90° C. until they are completely homogenized.

Another comparative composition, composition E, is prepared by mixing 3.6 g of a fatty amine surfactant, sold under the name Noram® SH by Arkema, 6.4 g of an alkoxylated phosphoric acid ester surfactant, comprising a hydrocarbon chain comprising 16 to 18 carbon atoms and 4.5 ethylene oxide units (Surfaline® PE684 by Arkema), 25 g of a microcrystalline mineral wax (freezing point >65° C., originating from Lotos Company) and 65 g of a degummed soybean oil originating from Cefetra. All the components are mixed at 90° C. until they are completely homogenized.

Another composition, composition F, according to the invention, is prepared by mixing 3.6 g of a fatty amine surfactant, sold under the name Noram® SH by Arkema, 6.4 g of an alkoxylated phosphoric acid ester surfactant, comprising a hydrocarbon chain comprising 16 to 18 carbon atoms and 4.5 ethylene oxide units (Surfaline® PE684 by Arkema), 25 g of a microcrystalline mineral wax (freezing point >65° C., from Lotos Company) and 65 g of a residue originating from tall oil, sold under the name Dertal by DRT. All the components are mixed at 90° C. until they are completely homogenized. This residue originating from tall oil contains more than 20% by weight of cyclic alcohols, which results in a content of at least 13% by weight of cyclic alcohol in the final coating composition. The viscosity of the tall oil residue used is measured using an MCR301 dynamic shear rheometer (Anton Paar) in a 50 mm parallel plate (PP50) geometry, between 50° C. and 10° C. at a shear rate of 80 $s^{-1}$, which gives a value of 3800 mPa·s at 25° C.

The properties, as protective coating against agglomeration, are evaluated in the following example 2.

Example 2

The following tests are carried out in order to evaluate the tendency to agglomeration of a sample of coated ammonium nitrate (AN 33.5), after having been subjected to heat and pressure and during transportation.

Compositions A and B (comparative compositions) as well as composition C (according to the invention) originating from example 1 are used as coating on AN granules. 500 g of AN granules are heated at 40° C. for 4 hours before being mixed in an open-end laboratory coating drum and sprayed with 0.5 g of coating composition sample, at 90° C.

Similarly, compositions D and E (comparative compositions) as well as composition F (according to the invention) originating from example 1 are used as coating on AN granules. 500 g of AN granules are heated at 40° C. for 4 hours before being mixed in an open-end laboratory coating drum and sprayed with 0.5 g of coating composition sample, at 90° C.

An accelerated agglomeration test is carried out with the coated samples. Metal molds were filled with 150 g of the coated AN granules, closed and subjected to a constant pneumatic pressure of 3 bar for 24 hours. The temperature of the samples was maintained at 40° C. during the whole of the 24 hours. Three samples were prepared for each coated sample. An uncoated sample was also evaluated for comparison.

After 24 hours, the molds were carefully opened and compressed in a universal compression machine (Instron 3365). The breaking force of the samples was recorded in each case. Table 1 presents the integral values of the results obtained for each coating (breaking force in kilograms-force, kgf).

TABLE 1

| Coating | Breaking force (kgf) | Standard deviation of the breaking force |
|---|---|---|
| Uncoated | 88.3 | 11.2 |
| Composition A (comparative) | 6.1 | 5.7 |
| Composition B (comparative) | 33.4 | 8 |

TABLE 1-continued

| Coating | Breaking force (kgf) | Standard deviation of the breaking force |
|---|---|---|
| Composition C (invention) | 6.4 | 2.3 |
| Composition D (comparative) | 7.2 | 4.3 |
| Composition E (comparative) | 8.4 | 1.7 |
| Composition F (invention) | 0 | — |

—Agglomeration of Coated Fertilizers—

It can be seen that comparative composition A and composition C according to the invention provide excellent protection against similar agglomeration. However, comparative composition A is based on mineral oils, which are less suitable for agricultural applications given that they are not environmentally friendly. On the other hand, the compositions prepared with conventional vegetable oils, such as comparative composition B containing soybean oil, are not sufficiently effective in an anti-caking coating for fertilizers.

It can also be seen that comparative composition D, based on mineral oils, and E, containing soybean oil, provide fairly good protection against agglomeration. Without being committed to a theory, it might be that the coupled surfactants used are more compatible with soybean oil than in the preceding examples. Composition F, comprising cyclic alcohols, provides excellent protection against agglomeration and no agglomeration was observed under the conditions of the tests.

Example 3

The following tests are carried out in order to evaluate the tendency to agglomeration of a sample of coated NPK 15-15-15 complex fertilizer, after having been subjected to heat and pressure and during transportation.

Composition G (according to the invention) is prepared by mixing 5 g of a fatty amine surfactant, sold under the name Noram® SH by Arkema, with 15 g of phosphoric acid alkoxylated ester surfactant, comprising a hydrocarbon chain containing from 16 to 18 carbon atoms and 4.5 ethylene oxide units (sold under the name Surfaline® PE684 by Arkema), 10 g of hydrogenated castor oil (from Mosselman), 35 g of degummed soybean oil originating from Cefetra and with 35 g of a residue originating from tall oil, sold under the name Dertal by DRT. All the components are mixed at 90° C. until they are completely homogenized. This residue originating from tall oil contains more than 20% by weight of cyclic alcohols, which results in a content of at least 7% by weight of cyclic alcohol in the final coating composition.

An anti-caking composition A commercially available under the name Fluidiram® 780 from Arkema (formulation based on mineral oils, and not containing cyclic alcohol) is used by way of comparison.

This commercially available anti-caking composition AG and composition G (according to the invention) are used as coating agents on NPK 15-15-15 granules. The NPK 15-15-15 granules (500 g) are heated at 40° C. for 4 hours before being mixed in an open-end laboratory coating drum and sprayed with 1.25 g of coating composition sample, at 90° C.

An accelerated agglomeration test is carried out with the coated samples. Metal molds were filled with 150 g of the coated NPK 15-15-15 granules, closed and subjected to a constant pneumatic pressure of 3 bar for 24 hours. The temperature of the samples was maintained at 25° C. during the whole of the 24 hours. Three samples were prepared for each coated sample. An uncoated sample was also evaluated for comparison.

After 24 hours, the molds were carefully opened and compressed in a universal compression machine (Instron 3365). The breaking force of the samples was recorded in each case. Table 2 presents the integral values of the results obtained for each coating (breaking force in kilograms-force, kgf).

TABLE 2

| Coating | Breaking force (kgf) | Standard deviation of the breaking force |
|---|---|---|
| Uncoated | 38.2 | 4.1 |
| Commercial coating (comparative) | 3.9 | 1.3 |
| Composition G (invention) | 1.6 | 1.1 |

—Agglomeration of Coated Fertilizers—

It is observed that composition G comprising cyclic alcohols according to the present invention results in better protection against agglomeration than that observed with the commercial coating composition comprising mineral oils.

The invention claimed is:

1. A coating composition comprising:

from 1% by weight to 30% by weight, limits included, of (i) at least one cationic surfactant chosen from primary amines, secondary amines and salts thereof, and (ii) at least one anionic surfactant comprising an ethoxylated or propoxylated monoalkyl ester or an ethoxylated or propoxylated dialkyl ester of phosphoric acid containing a $C_{16}$-$C_{20}$ hydrocarbon chain;

from 5% by weight to 99% by weight, limits included, of a cyclic alcohol, comprising 12 to 100 carbon atoms, limits included, and of esters thereof, the source of the cyclic alcohol being a phytosterol; and a wax.

2. The composition as claimed in claim 1, wherein the cationic surfactant is a fatty amine comprises 16 to 18 carbon atoms.

3. The composition as claimed in claim 1, wherein the ester of the cyclic alcohol is a fatty acid ester.

4. The composition as claimed in claim 1, wherein the wax is a mineral wax.

5. The composition as claimed in claim 1, wherein the wax is a microcrystalline mineral wax.

6. The composition as claimed in claim 1, wherein the cyclic alcohol has a molecular weight of greater than 100 $g \cdot mol^{-1}$.

7. The composition as claimed in claim 1, wherein the anionic surfactant is an ethoxylated monoalkyl ester or an ethoxylated dialkyl ester of phosphoric acid containing a $C_{16}$-$C_{20}$ hydrocarbon chain.

8. The composition as claimed in claim 1, wherein the cyclic alcohol is present at dosages ranging from 7% by weight to 80% by weight, limits included, with respect to the total coating composition.

9. The composition as claimed in claim 1, further comprising one or more other components selected from:

rheology modifiers, amidoamides, alkylamidoamides;

hydrophobizing agents;

dispersing agents;

dyes, UV tracers, pigments, colorants;

mineral and/or organic micronutrients and trace elements which can be finely dispersed and/or compatibilized;

biostimulants;

pesticides;

bacteria, yeasts, fungi, viruses;

antioxidants, preservatives, UV stabilizers; and odor-masking agents, antiodorants, aromas, fragrances.

10. A method for coating a granular material selected from fertilizers, coal, ores, mineral aggregates, sulfur, wood chips, dirt, granulated waste, medicaments, cereals, and granulated animal feed, comprising contacting the granular material with the composition as claimed in claim 1.

11. A granular material coated with the composition as claimed in claim 1.

12. The granular material as claimed in claim 11 which is a fertilizer granule.

13. The composition as claimed in claim 1, wherein the composition is in liquid form.

14. The composition as claimed in claim 1, wherein the cationic surfactant is octadecylamine.

15. The composition as claimed in claim 1, wherein the anionic surfactant is an ethoxylated mono(n-octadecyl) ester of phosphoric acid or a propoxylated mono(n-octadecyl) ester of phosphoric acid.

16. The composition as claimed in claim 1, wherein the anionic surfactant is an ethoxylated di(n-octadecyl) ester of phosphoric acid or a propoxylated di(n-octadecyl) ester of phosphoric acid.

17. The composition as claimed in claim 1, wherein the cationic surfactant is octadecylamine and the anionic surfactant is an ethoxylated mono(n-octadecyl) ester of phosphoric acid or a propoxylated mono(n-octadecyl) ester of phosphoric acid.

18. The composition as claimed in claim 1, wherein the cationic surfactant is octadecylamine and the anionic surfactant is an ethoxylated di(n-octadecyl) ester of phosphoric acid or a propoxylated di(n-octadecyl) ester of phosphoric acid.

* * * * *